(12) United States Patent
Han

(10) Patent No.: US 11,033,443 B2
(45) Date of Patent: Jun. 15, 2021

(54) ELECTRONIC WHEELCHAIR HAVING VOICE-RECOGNITION OPERATING SYSTEM

(71) Applicant: In Suk Han, Sandy, UT (US)

(72) Inventor: In Suk Han, Sandy, UT (US)

( * ) Notice: Subject to any disclaimer, the term of this patent is extended or adjusted under 35 U.S.C. 154(b) by 75 days.

(21) Appl. No.: 15/545,632

(22) PCT Filed: Jan. 22, 2016

(86) PCT No.: PCT/KR2016/000708
§ 371 (c)(1),
(2) Date: Jul. 21, 2017

(87) PCT Pub. No.: WO2016/117963
PCT Pub. Date: Jul. 28, 2016

(65) Prior Publication Data
US 2018/0036185 A1 Feb. 8, 2018

(30) Foreign Application Priority Data

Jan. 23, 2015 (KR) .......................... 10-2015-0011545

(51) Int. Cl.
*G10L 25/00* (2013.01)
*G10L 21/00* (2013.01)
(Continued)

(52) U.S. Cl.
CPC ............... *A61G 5/024* (2013.01); *A61G 5/04* (2013.01); *A61G 5/046* (2013.01); *A61G 5/06* (2013.01);
(Continued)

(58) Field of Classification Search
CPC ..... G06F 19/00; G06F 19/3418; G10L 15/00; G10L 15/265; G10L 2015/223;
(Continued)

(56) References Cited

U.S. PATENT DOCUMENTS 4,483,405 A * 11/1984 Noda ..................... A61G 5/045
180/6.5
5,123,495 A * 6/1992 Littlejohn .............. A61G 5/061
180/9.32

(Continued)

FOREIGN PATENT DOCUMENTS

CN 203677399 U * 7/2014
JP 2003/310665 A 11/2003
(Continued)

OTHER PUBLICATIONS

P. Wellman, V. Krovi, V. Kumar and W. Harwin, "Design of a wheelchair with legs for people with motor disabilities," in IEEE Transactions on Rehabilitation Engineering, vol. 3, No. 4, pp. 343-353, Dec. 1995. doi: 10.1109/86.481974 (Year: 1995).*

(Continued)

*Primary Examiner* — Michael Ortiz-Sanchez
(74) *Attorney, Agent, or Firm* — Robert R. Mallinckrodt

(57) ABSTRACT

The present invention relates to an electric wheelchair having a voice recognition drive system comprising: a traveling apparatus main body unit which has a plurality of wheels in a lower end thereof; a seating unit which is installed in an upper end of the traveling apparatus main body unit so as to be able to be lifted; an auxiliary robot leg unit which is able to be inserted into and protrude from the traveling apparatus main body unit, and which includes multi-joint driven by an external force; and a voice recognition drive unit which extracts a preset command from an externally input voice, and which drives the plurality of wheels, lifts the seating unit, and drives the auxiliary robot leg unit.

11 Claims, 9 Drawing Sheets

(51) Int. Cl.
*A61G 5/02* (2006.01)
*A61G 5/10* (2006.01)
*A61G 5/04* (2013.01)
*A61G 5/08* (2006.01)
*A61G 5/12* (2006.01)
*A61G 5/06* (2006.01)
*G06F 3/01* (2006.01)
*G06F 3/16* (2006.01)

(52) U.S. Cl.
CPC ........... *A61G 5/068* (2013.01); *A61G 5/0866* (2016.11); *A61G 5/10* (2013.01); *A61G 5/1059* (2013.01); *A61G 5/1067* (2013.01); *A61G 5/127* (2016.11); *G06F 3/015* (2013.01); *A61G 2203/18* (2013.01); *A61G 2203/20* (2013.01); *A61G 2203/32* (2013.01); *G06F 3/167* (2013.01)

(58) Field of Classification Search
CPC .......... G16H 40/67; G05B 2219/23386; Y10S 180/907; Y10S 297/04; Y10S 280/10; Y10S 297/10; A61G 2203/12; A61G 5/04; A61G 5/061; A61G 5/14; A61G 12/00; A61G 2203/18; A61G 2203/36; A61G 5/024
See application file for complete search history.

(56) References Cited

U.S. PATENT DOCUMENTS

| | | | | |
|---|---|---|---|---|
| 5,253,724 A * | 10/1993 | Prior | ...................... | A61G 5/045 180/6.5 |
| 5,335,313 A * | 8/1994 | Douglas | ................. | A61G 7/018 379/355.01 |
| 5,812,978 A * | 9/1998 | Nolan | ..................... | A61G 5/045 704/275 |
| 5,964,473 A * | 10/1999 | Degonda | ................. | A61G 5/043 180/907 |
| 6,108,592 A * | 8/2000 | Kurtzberg | ................ | A61G 5/04 180/167 |
| 6,553,271 B1 * | 4/2003 | Morrell | ................... | B60L 11/18 700/37 |
| 6,571,892 B2 * | 6/2003 | Kamen | .................. | A61G 5/061 180/21 |
| 6,842,692 B2 * | 1/2005 | Fehr | ....................... | G01C 21/20 701/23 |
| 7,503,567 B2 * | 3/2009 | Frankie | .................... | A61G 5/04 180/8.2 |
| 8,489,251 B2 * | 7/2013 | Wakefield, II | .......... | G06F 17/00 701/1 |
| 8,924,218 B2 * | 12/2014 | Corpier | .................. | A61G 5/024 701/22 |
| 2011/0162896 A1 * | 7/2011 | Gillett | ...................... | B60K 1/04 180/2.2 |
| 2013/0046438 A1 * | 2/2013 | Summer | ................... | A61G 5/10 701/36 |
| 2014/0135981 A1 * | 5/2014 | Cooper | ................. | A61G 7/1017 700/245 |
| 2014/0268560 A1 * | 9/2014 | Duerstock | ........... | F16M 13/022 361/679.58 |
| 2016/0052138 A1 * | 2/2016 | Hyde | ..................... | B25J 9/1697 701/3 |
| 2017/0042439 A1 * | 2/2017 | Yeow | ..................... | G16H 10/60 |
| 2017/0095382 A1 * | 4/2017 | Wen | .................... | G06F 19/3418 |

FOREIGN PATENT DOCUMENTS

| | | |
|---|---|---|
| KR | 2005/0007696 | 1/2005 |
| KR | 101046877 B1 | 7/2011 |
| KR | 101437374 B1 | 9/2014 |
| KR | 2014/0128086 A | 11/2014 |
| KR | 101484955 B | 1/2015 |

OTHER PUBLICATIONS

M. Lawn and T. Takeda, "Design of a robotic-hybrid wheelchair for operation in barrier present environments," Proceedings of the 20th Ann. International Conf. of the IEEE Eng. in Med. & Bio Society. vol. 20 Biomedical Engineering Towards the Year 2000 and Beyond, 1998, pp. 2678-2681 vol. 5, doi: 10.1109/IEMBS.199.*

* cited by examiner

ELECTRONIC WHEELCHAIR HAVING VOICE-RECOGNITION OPERATING SYSTEM

TECHNICAL FIELD

The present invention relates to an electric wheelchair having a voice recognition drive system, and more particularly, to an electric wheelchair having a voice recognition drive system that can be operated in various manners by voice and can stably maintain the body of a vehicle by using auxiliary robot legs in the form of a spider leg at the time of running or being stopped.

BACKGROUND ART

In general, as the quality of life is improved along with the development of modern society, the interest in the disabled is increasing day by day, and heavy investment is effectively made to improve the environment for the disabled. Particularly, in some countries, it is mandatory to install wheelchair lifts or the like in all workplaces, public facilities and commercial areas under the protection of law.

A wheelchair is a means of transportation used by a person with physical disability, a patient, or the old and the infirm who have mobility difficulty, and the wheelchair as a means of transportation has a satisfactory function for a person who is uncomfortable to walk. However, when he or she actually takes other actions in the usual way, such as sitting in the wheelchair to use the wheelchair or getting out of the wheelchair, or going to wash room, there is an inconvenient problem in that it is necessary to call upon others for help every time.

As a means for solving such a problem, there is a prior application "wheelchair seat moving device" of KR Utility Model No. 20-2005-0007696.

This is configured of a seat portion which includes a plurality of connecting straps connecting side frames so that a user can sit on a wheelchair which includes wheels and the side frames which are disposed in such a manner that the front and rear sides are opened, rings at both ends of the connecting straps, and a seat plate disposed in an upper portion; a connecting portion which includes an iron ring connected to a ring formed in the connecting straps of the seat portion, an extension, formed at the center of the outer end of the iron ring, which is wound and fixed to a lifting wire, a buffer ring which is formed between the wound extensions, and a fixing ring which is formed to fix upper and lower ends of the lifting wire; a guide portion which includes a cutting hole which is formed on one side of the guide frame so that the lifting wire of the connecting portion is inserted, and a guide plate for connecting the fixing ring; a driving portion which includes a driving shaft in which a helix is formed on an inside diameter of a driving hole so that the guide plate of the guide portion is connected and lifted up and down, a rotating rod which is spirally coupled with the inside diameter of the driving shaft and rotates, and a rotating sprocket which is formed in an upper portion of the rotating rod so as to be connected to a driving sprocket which is formed in an upper portion of a drive motor by a drive chain; and a switch portion which rotates the drive motor in forward and reverse directions by applying power of the driving portion.

However, such a method has a problem in that the structure is complicated and the number of parts required for assembling is large such that the time and the personnel necessary for assembling work should be additionally provided and the maintenance is difficult.

DISCLOSURE

Technical Problem

It is an object of the present invention to provide an electric wheelchair having a voice recognition drive system in which auxiliary robot legs having a shape of a spider leg are mounted in a vehicle body so as to stably maintain the vehicle body at the time of running or being stopped.

It is another object of the present invention to provide an electric wheelchair having a voice recognition drive system capable of recognizing a voice of a disabled person and automatically controlling a running condition of a vehicle body and a lifting position of a chair.

It is still another object of the present invention to provide an electric wheelchair having a voice recognition drive system capable of automatically adjusting a seating position and a running position when a disabled person is seated or when a vehicle body runs after the disabled person is seated, and capable of achieving easy storage.

Technical Solution

In a preferable aspect, there is provided an electric wheelchair having a voice recognition drive system including: a traveling apparatus main body unit which has a plurality of wheels in a lower end thereof; a seating unit which is installed in an upper end of the traveling apparatus main body unit so as to be able to be lifted; an auxiliary robot leg unit which is able to be inserted into and protrude from the traveling apparatus main body unit, and which includes multi-joint driven by an external force; and a voice recognition drive unit which extracts a preset command from an externally input voice, and which drives the plurality of wheels, lifts the seating unit, and drives the auxiliary robot leg unit.

The voice recognition drive unit includes: a voice input unit which is installed in the seating unit and which receives a voice from outside; a travel drive unit which controls traveling of the plurality of wheels; a lifting drive unit which controls lifting of the seating unit; a robot drive unit which controls driving of the auxiliary robot leg; and a controller which is provided with preset commands for controlling the driving of the plurality of wheels, the lifting of the seating unit, and the driving of the auxiliary robot leg, and which extracts the commands from a voice input through the voice input unit, and controls driving of the travel drive unit, the lifting drive unit, or the robot drive unit corresponding to the extracted command.

The lifting drive unit includes: a lifting member which connects the traveling apparatus main body unit and a lower end of the seating unit and which has a length adjusted vertically by external power; and a drive cylinder which receives a driving signal from the controller, and controls an adjusting operation of a length of the lifting member.

The lifting member includes a plurality of lifting ribs hingedly connected to be folded so as to intersect with each other.

Among the plurality of lifting ribs, a first roller is provided in a lower end of a pair of lowermost lifting ribs respectively, and a second roller is provided in an upper end of a pair of uppermost lifting ribs respectively.

A first rail on which the respective first rollers can roll is formed in the traveling apparatus main body unit, and a second rail on which the respective second rollers can roll is formed in a lower end of the seating unit.

The drive cylinder includes a cylinder body having a shaft which is extended and contracted in a horizontal direction in response to a drive signal from the controller.

The shaft is connected to a center of rotation of one of the respective first rollers and another roller is located in a fixed position on the first rail.

The auxiliary robot leg unit includes a plurality of auxiliary robot legs arranged in a plurality of positions on both sides of the traveling apparatus main body unit.

Each of the plurality of auxiliary robot legs includes: a plurality of unit joints; and a plurality of rotation motors which connect the plurality of unit joints to be rotated, and which are driven in response to a driving signal from the robot drive unit.

Holes for allowing the plurality of auxiliary robot legs to be inserted and withdrawn are formed in a plurality of positions on both sides of the traveling apparatus main body unit, and an accommodation space for receiving the plurality of auxiliary robot legs inserted through the holes is formed in an interior of the traveling apparatus main body unit.

In the accommodation space, a sliding drive unit which slides the plurality of auxiliary robot legs so that the plurality of auxiliary robot legs can be inserted into the accommodation space or withdrawn to an external position in response to a control signal from the controller is installed.

The seating unit is connected to the lifting drive unit, and includes: a seat portion; a backrest portion which is hingedly connected to an end of the seat portion so as to be foldable; a handgrip portion which is hingedly connected to both sides of the seat portion so as to be foldable; and a leg rest portion which is hingedly connected to a front end of the seat portion so as to be foldable.

The seating unit is formed in a rectangular box shape when the backrest portion and the leg rest portion are folded.

The seating unit is provided with a light collecting plate for collecting sunlight.

A battery for converting heat energy collected by the light collecting plate into electric energy for driving the voice recognition drive unit and storing the electrical energy is installed in the traveling apparatus main body unit.

The seating unit is provided with a GPS module for receiving position information via a satellite and transmitting the received position information to the controller.

A weight sensor for sensing a weight of a user when the user is seated and transmitting the sensed weight to the controller, and a temperature sensor for sensing a temperature and transmitting the sensed temperature to the controller are installed in a plurality of positions of the seating unit.

The traveling apparatus main body unit includes: a lower main body portion having a disc shape which is provided with a rotator having a rotation shaft rotated in response to a drive signal from the controller, and which is provided with a plurality of wheels; and an upper main body portion having a disc shape which is disposed in an upper end of the lower main body portion, and connected to the rotation shaft and rotates, and which is provided with the auxiliary robot leg unit.

The electric wheelchair further includes an electroencephalogram (EEG) control driver.

The EEG control drive unit includes: a selection mode which is connected to the controller, and which selects to use one of the voice recognition drive unit and the EEG control driver; and an EEG recognition unit which recognizes EEG from a head of a user and transmits the recognized EEG to the controller.

Information related to a gamma wave, a beta wave, an alpha wave, a theta wave, and a delta wave is previously set in the controller.

The controller extracts a ratio of the gamma, beta, alpha, theta, and delta waves from the recognized EEG, and controls the travel drive unit, the lifting drive unit, and the robot drive unit depending on the extracted ratio.

The ratio of the gamma, beta, alpha, theta, and delta waves is previously set in the controller with respect to driving of the travel drive unit, the lifting drive unit, and the robot drive unit.

Advantageous Effects

An embodiment of the present invention may include a spider leg-shaped auxiliary robot leg on a vehicle body to stably maintain the vehicle body when a vehicle runs or is stopped.

In addition, an embodiment according to the present invention may recognize the voice of the disabled person and automatically control the running condition of the vehicle body and the lifting position of a seat.

In addition, an embodiment according to the present invention may variably adjust the lifting position of the seating unit on which the disabled person is seated so that it is possible to satisfy the running condition of the disabled person when a disabled person is seated or when a vehicle body runs after the disabled person is seated.

In addition, in an embodiment according to the present invention, each configuration of the seating unit may be connected by a hinge and able to be folded, so that it can be folded in a rectangular box shape to achieve easy storage in case of not running.

Further, an embodiment according to the present invention may detect that a disabled person is seated in the seating unit and control a driving related to traveling, thereby preventing a safety accident caused by the driving of the traveling apparatus before a disabled person is seated.

In addition, an embodiment according to the present invention may include a GPS module that receives position information from a satellite so that it is possible to inform a disabled person of a movement position through a voice or a display device when the disabled person moves through the traveling apparatus, and notify the guardian of the movement position of the disabled person in real time.

In addition, an embodiment according to the present invention may implement the traveling apparatus main body unit in the shape of a disk, and make the upper main body unit rotatable so that the disabled person can easily switch the direction while being seated in the seating unit.

MODE FOR INVENTION

Hereinafter, an electric wheelchair having a voice recognition drive system of the present invention is described with reference to the accompanying drawings.

Figure 1:
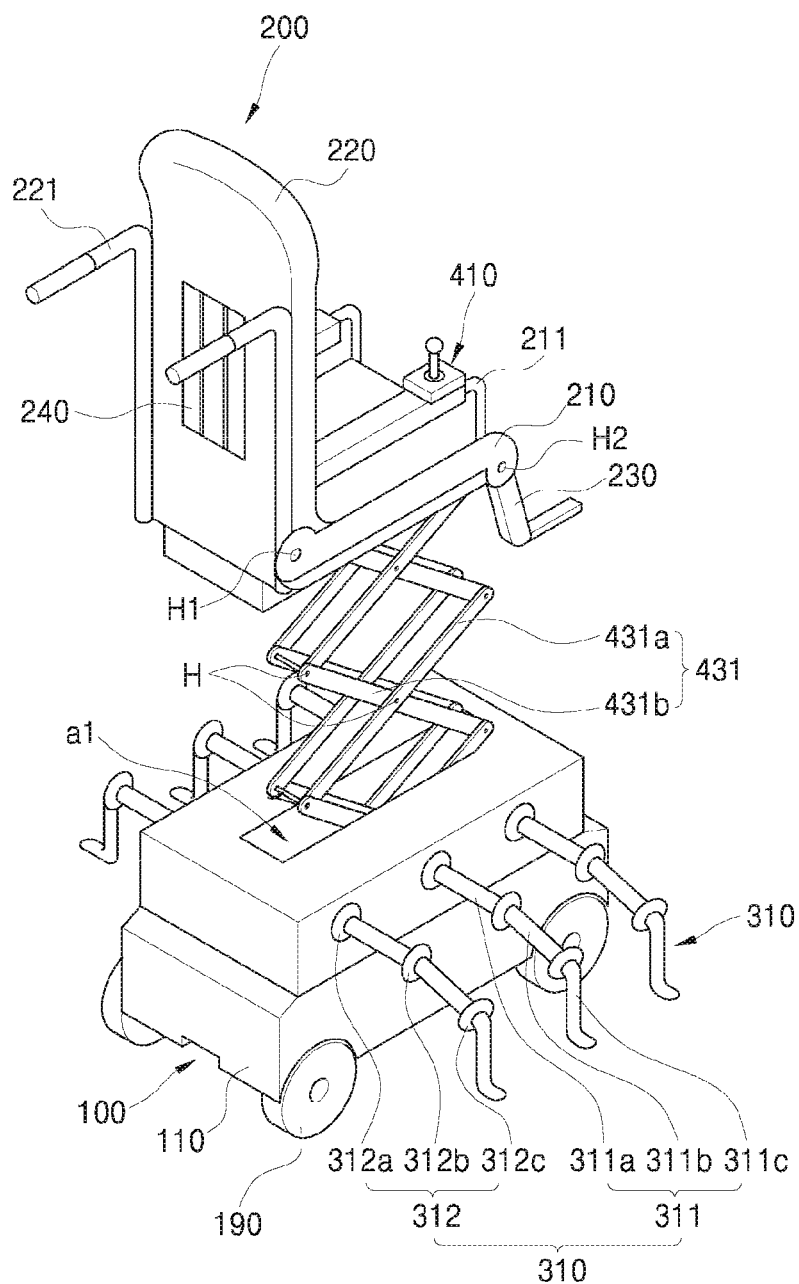
FIG. 1 is a perspective view showing an electric wheelchair having a voice recognition drive system of the present invention.
Figure 2:
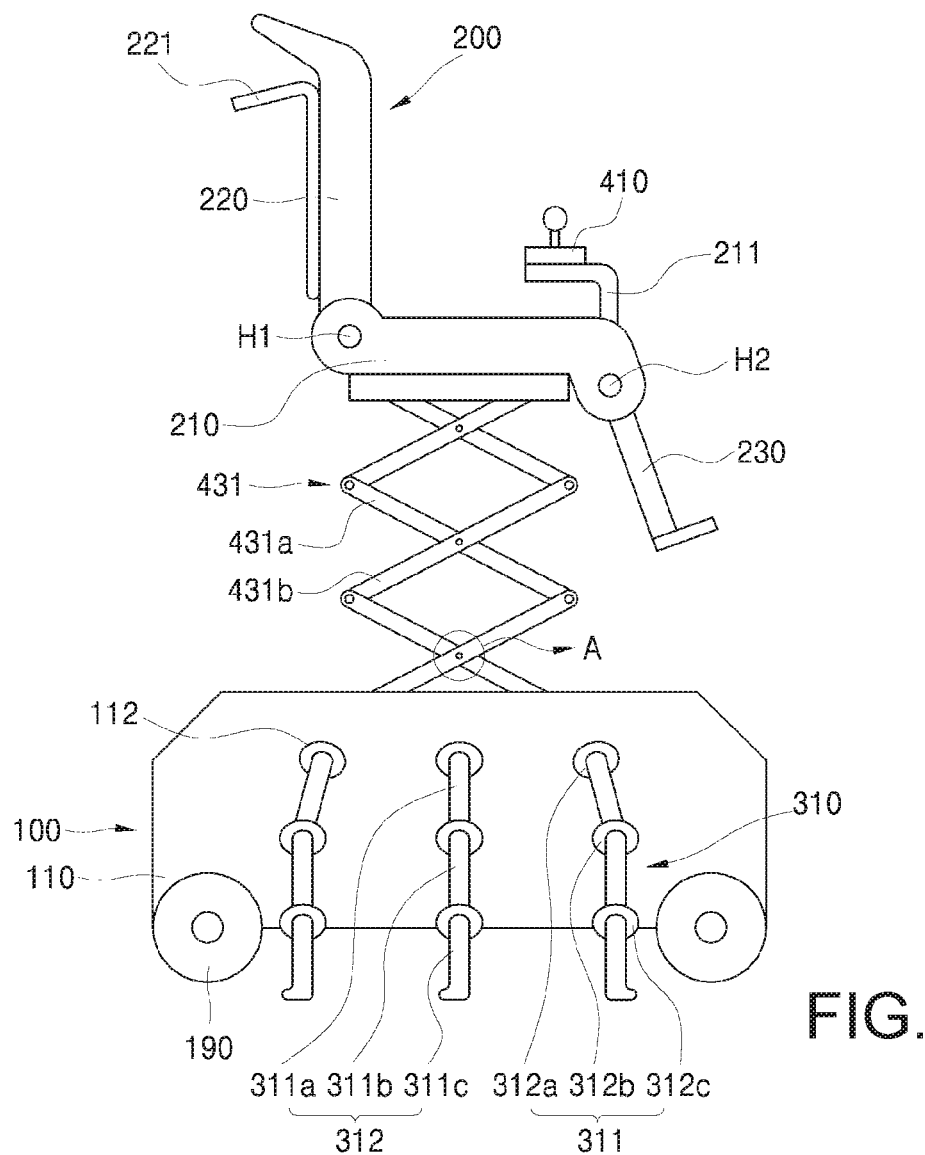
FIG. 2 is a front view showing an electric wheelchair having a voice recognition drive system of the present invention.
Figure 3:
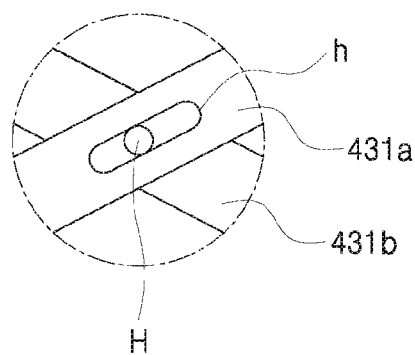
FIG. 3 is an enlarged view showing an indication character A of FIG. 2.
Figure 4:
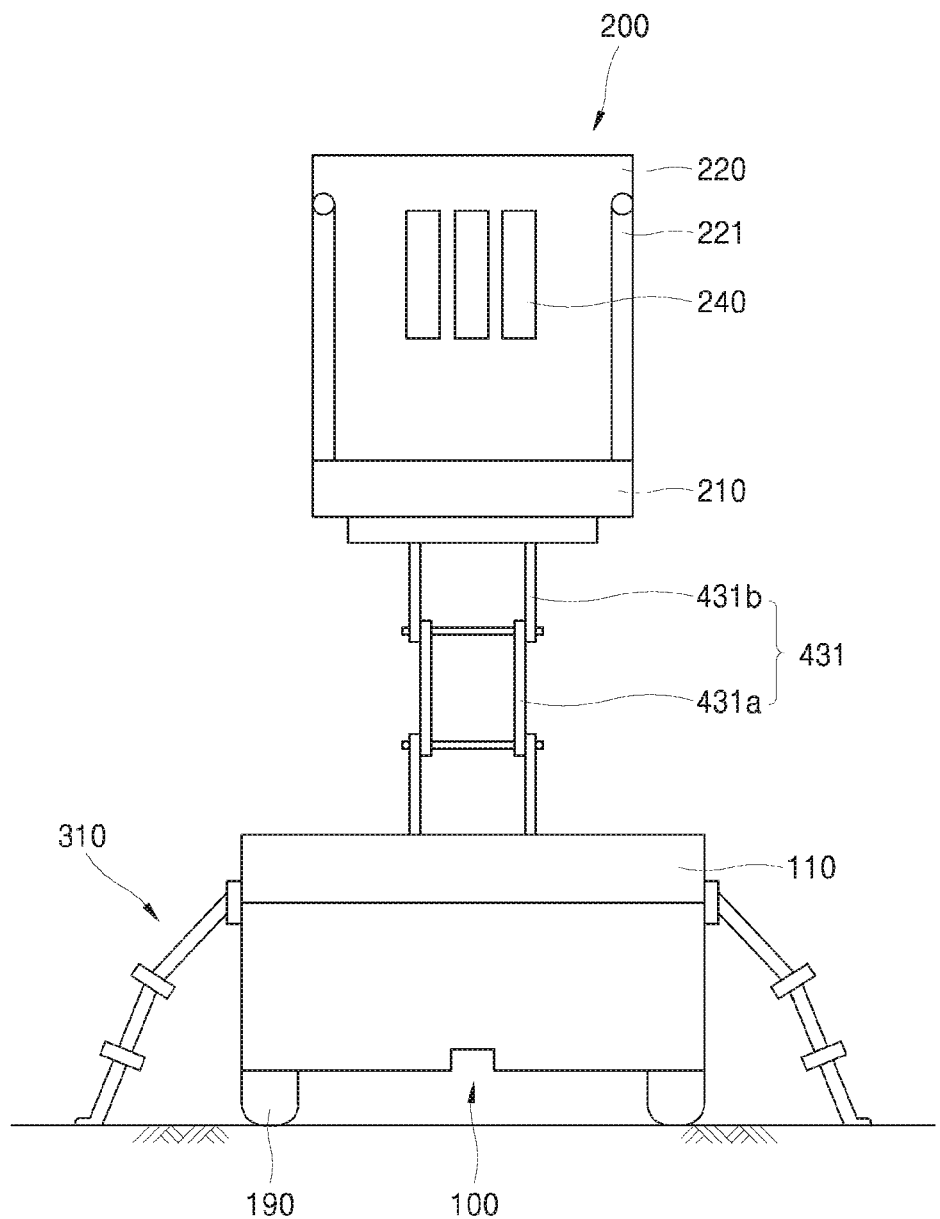
FIG. 4 is a side view showing an electric wheelchair having a voice recognition drive system of the present invention.
Figure 5:
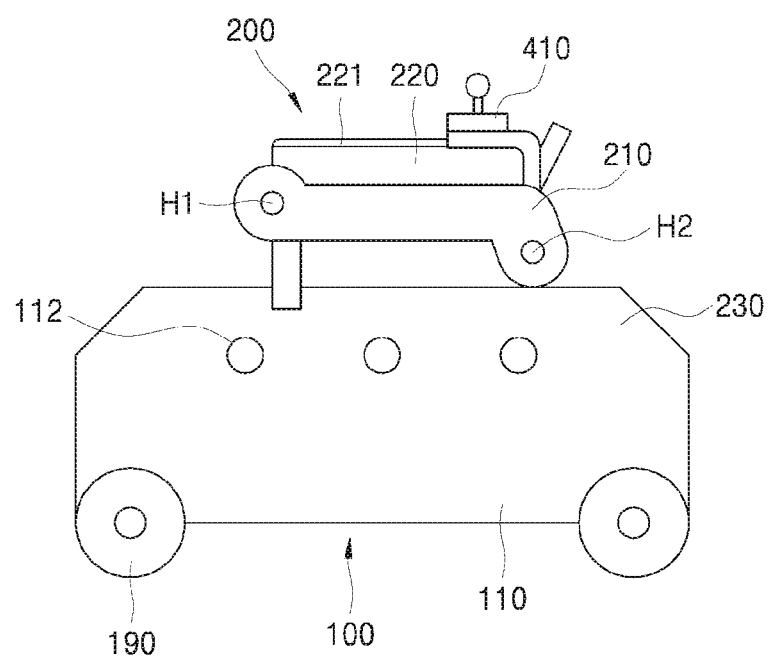
FIG. 5 is a side view showing a folded state of a seating unit according to the present invention.
Figure 6:
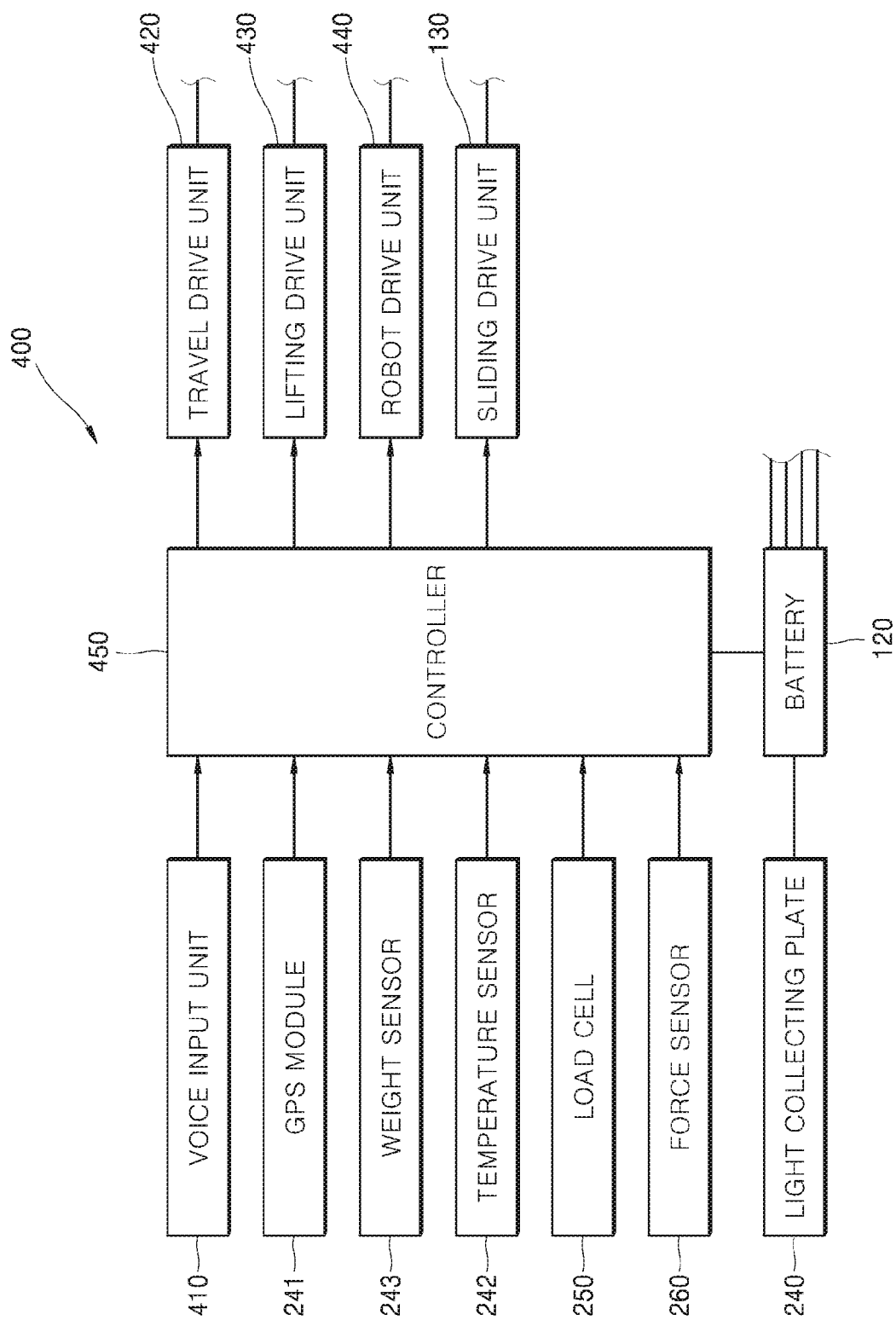
FIG. 6 is a block diagram showing a configuration of an electric wheelchair having a voice recognition drive system of the present invention.

FIG. 1 is a perspective view showing an electric wheelchair having a voice recognition drive system of the present invention, FIG. 2 is a front view showing an electric wheelchair having a voice recognition drive system of the present invention, FIG. 3 is an enlarged view showing an indication character A of FIG. 2, FIG. 4 is a side view showing an electric wheelchair having a voice recognition drive system of the present invention, FIG. 5 is a side view showing a folded state of a seat portion according to the present invention, and FIG. 6 is a block diagram showing a configuration of an electric wheelchair having a voice recognition drive system of the present invention.

The electric wheelchair having a voice recognition drive system of the present invention may briefly include a traveling apparatus main body unit 100, a seating unit 200, an auxiliary robot leg unit 300, and a voice recognition drive unit 400.

Hereinafter, the above configuration is described in detail.

The Traveling Apparatus Main Body Unit 100

Referring to FIG. 1 and FIG. 2, the traveling apparatus main body unit 100 according to the present invention may include a main body 110 and a plurality of wheels 190.

The plurality of wheels 190 may be installed at both ends of the main body 110 and include front and rear wheels.

The plurality of wheels 190 may be rotated by driving of a travel drive unit 720 which is described later so that the main body 110 travels along the ground.

The Seating Unit 200

The seating unit 200 may be disposed at an upper portion of the main body, and may be lifted along a vertical direction by driving of a lifting drive unit 430 which is described later.

The seating unit 200 may include a seat portion 210 on which a user such as a disabled person sits, a backrest portion 220, a handgrip portion 211, and a leg rest portion 230.

The seat portion 210, which is connected to the lifting drive unit 430, is a place where a hip part of a disabled person is positioned.

The backrest portion 220 may be connected to a rear end of the seat portion 210 by a hinge (H1) and, preferably, the front and rear angle of the backrest portion 220 may be adjusted based on the seat portion 210.

The backrest portion 220, which is a place where the back of a disabled person is positioned, may be foldable at the rear end of the seat portion 210, The handgrip portion 211 may be formed in both sides of the seat portion 210. The handgrip portion 211 may serve as an armrest that supports the arm of a disabled person.

The handgrip portion 211 may be provided with an adjustment device (not shown) configured to adjust the driving direction and speed of the wheels 190 by directly driving a travel drive unit 420.

In addition, the handgrip portion 211 may be provided with a voice input unit 410 such as a microphone which is described later.

The handgrip portion 211 may also be connected by a hinge at both sides of the seat portion 210 so as to be foldable.

The leg rest portion 230, which is an element where a leg of a disabled person is placed, may be provided in the front end of the seat portion 210.

The leg rest portion 230 may be connected to the front end of the seat portion 210 by a hinge H2, extended with a certain length along a lower portion, and be foldable.

In addition, a pair of handles 221 may be provided in the rear end of the backrest portion 220 so that another person can hold and push the wheelchair by hand.

The handle 221 may be detachable from the rear end of the backrest portion 220.

Accordingly, the seating unit 200 configured as described above may be folded in the form of a rectangular box and may be easily stored when respective configurations are folded.

The folding process of the seating unit 200 is described later.

The Auxiliary Robot Leg Unit 300

The auxiliary robot leg unit 300 according to the present invention may be installed in the traveling apparatus main body unit 100.

The auxiliary robot leg unit 300 may include a plurality of auxiliary robot legs 310.

For example, the auxiliary robot leg 310 may be configured of six pieces, and three pieces may be provided to both sides of the main body.

Each of the auxiliary robot legs 310 may include unit joints 311 having a certain length, and rotation motors 312 which connect the unit joints 311 and rotate each joint 311 along multiple axes.

Here, the unit joints 311 may include a first unit joint 311a connected to the main body 110, a second unit joint 311b, and a third unit joint 311c having an end which is supported by the ground.

In addition, the rotation motors 312 may include a first rotation motor 312a connecting the main body 110 and the first unit joint 311a, a second rotation motor 312b connecting the first unit joint 311a and the second unit joint 311b, and a third rotation motor 312c connecting the second unit joint 311b and the third unit joint 311c.

The first, second, and third rotation motors 312a, 312b, and 312c may be driven by a robot drive unit 440 which is described later.

Three auxiliary robot legs 310 configured as described above may be installed in both sides of the main body 110.

A load cell 250 (see FIG. 6) for measuring a pressure value of supporting the ground may be provided in a lower end of the third unit joint 311c of each of the auxiliary robot legs 310.

Further, a force sensor 260 (see FIG. 6) may be provided to each of the rotation motors 312 between respective unit joints 311.

Therefore, a pressure value of the auxiliary robot leg 310 with respect to the ground and a force value measured in each unit joint 311 may be transmitted to a controller 450 (see FIG. 6), and the controller 450 may drive respective rotation motors 312 so as to attain the posture of each unit joint 311 based on the measured pressure value and force value.

For example, the controller 450 which is described later may control the driving of the first, second and third rotation motors 312a, 312b, and 312c of the respective auxiliary robot legs 310 through the driving of the robot drive unit 440 so that the pressure measured from the load cell 250 of respective auxiliary robot legs 310 may be equalized, thereby controlling the posture of the main body 110 so as to balance the main body 110.

Accordingly, when the main body 110 travels through the plurality of wheels 190, the auxiliary robot leg unit 300 according to the present invention can achieve a stable traveling by applying more thrust on the ground, and can stably maintain the stationary state of the main body 110, when being stopped.

Furthermore, when the main body 110 is positioned on land having a certain slope, the problem that the main body 110 slips or collapses along the slope may be solved.

In addition, the auxiliary robot legs 310 according to the present invention may be used to easily go up and down the stairs.

The Voice Recognition Drive Unit 400

The voice recognition drive unit 400 according to the present invention may include a voice input unit 410, a travel drive unit 420, a lifting drive unit 430, a robot drive unit 440, and a controller 450.

The voice input unit 410 may be installed in the seat portion 210, and preferably may be installed in the handgrip portion 211 so that the voice of a disabled person can be easily input.

In addition, the voice input unit 410 may be a device such as a microphone, and may be configured to be extended with a certain length from the handgrip portion 211 so as to be close to the mouth of a disabled person.

The voice input through the voice input unit 410 may be transmitted to the controller 450, which is described later, in a form of an electric signal.

Figure 7:
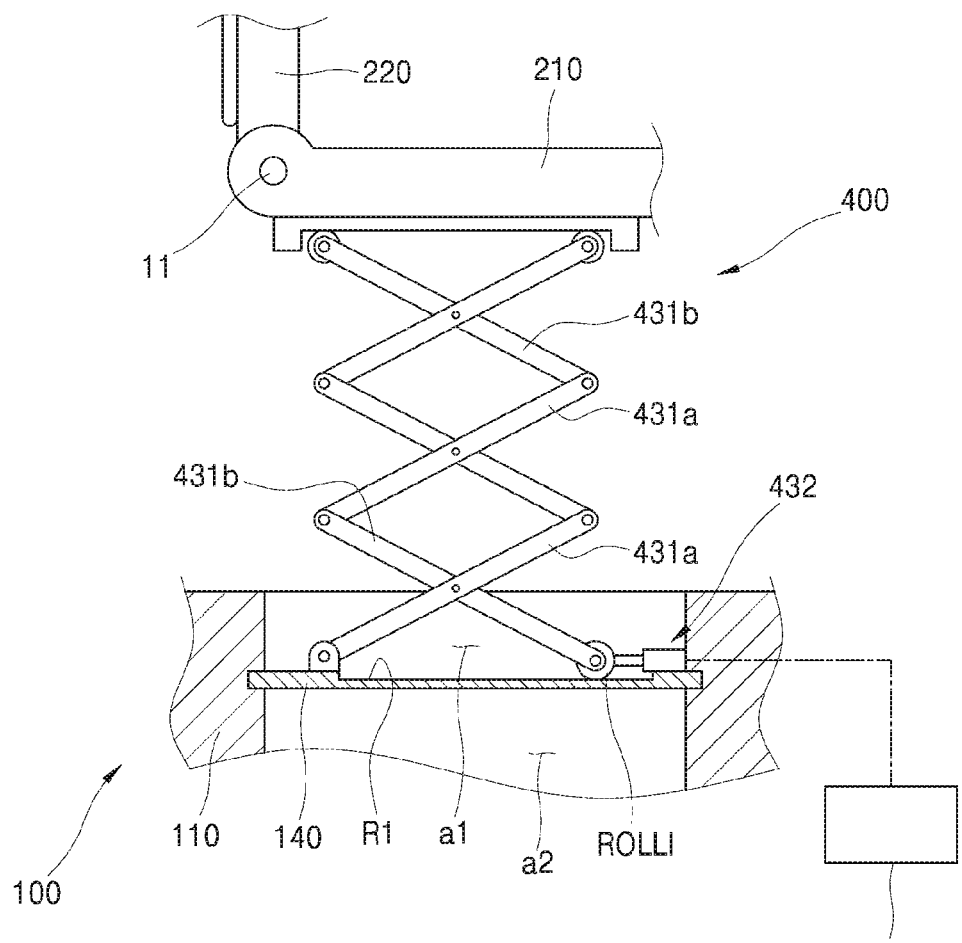
FIG. 7 is a view showing a lifting drive unit according to the present invention.
Figure 8:
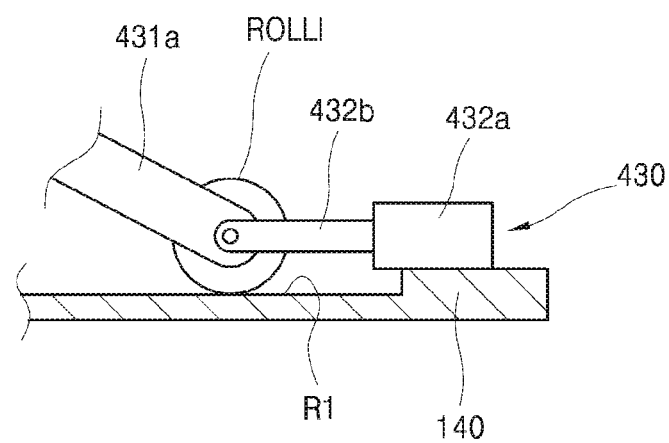
FIG. 8 is a view showing a coupling relationship between a drive cylinder and a first roller of FIG. 7.
Figure 9:
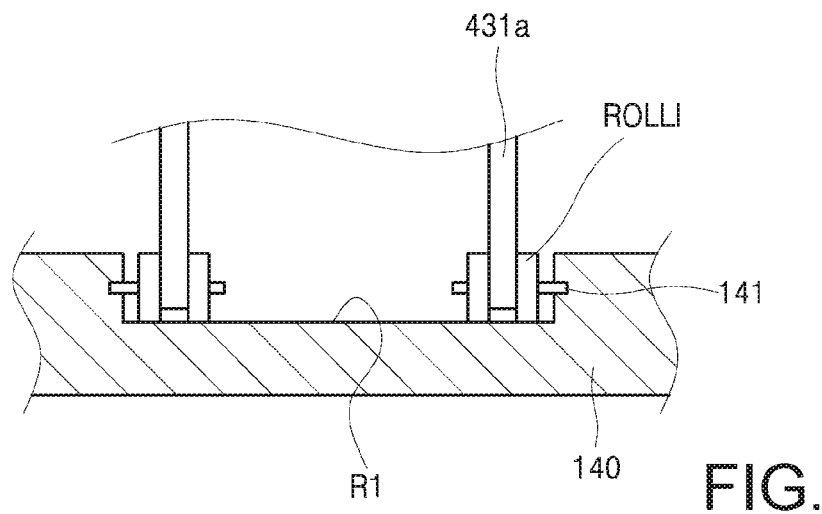
FIG. 9 is a view showing that the first roller is disposed on a first rail.

FIG. 6 is a block diagram showing a configuration of an electric wheelchair having a voice recognition drive system of the present invention, FIG. 7 is a view showing a lifting drive unit according to the present invention, FIG. 8 is a view showing a coupling relationship between a drive cylinder and a first roller of FIG. 7, and FIG. 9 is a view showing that the first roller is disposed on a first rail.

Referring to FIGS. 1 and 6, a lifting drive unit 460 may serve to lift the seating unit 200 from an upper portion of the traveling apparatus main body unit 100.

Referring to FIGS. 7 to 9, the lifting drive unit 460 may include a lifting member 431 and a drive cylinder 432.

The lifting member 431 may include first lifting ribs 431a and second lifting ribs 431b which have a certain length.

The first and second lifting ribs 431a and 431b may be disposed to intersect with each other in a vertical direction, and the intersecting portion may be connected by a hinge H so as to be foldable.

Here, as shown in FIG. 3, an elongated hole h through which the hinge H is inserted and slid may be formed in the first lifting rib 431a, so that the first and second lifting ribs 431a and 431b can be folded while being intersected.

Here, a pair of first rollers ROLL 1 may be provided in the lower end of the first and second lifting ribs 431a and 431b at the lowermost portion.

Preferably, the first roller ROLL 1 may be provided in the lower end of the lowermost second lifting rib 431b, and the lower end of the lowermost first lifting rib 431a may be fixed and rotatable to one side of a first rail R1 which is described later.

On the other hand, in the inside of the traveling apparatus main body unit 100, two layers may be formed in such a manner that a first accommodation space a1 is formed in an upper portion and a second accommodation space a2 is formed in a lower portion.

The first and second accommodation spaces a1 and a2 may be partitioned by a partition plate 140 installed inside the main body 110.

In the upper end of the partition plate 140, the first rail R1 in which a pair of first rollers ROLL 1 can roll may be formed.

In addition, as shown in FIG. 9, a shaft end constituting a center of rotation of the first roller ROLL 1 may be positioned and slid in a guide groove 141 formed in the inner side surface portion of the first rail R1.

In addition, a pair of second rollers ROLL 2 may be provided in the upper end of the uppermost first and second lifting ribs 431a and 431b.

Here, a second rail R2 in which a pair of second rollers ROLL 2 are rail-coupled and slid may be provided in the lower end of the seat portion 210 according to the present invention.

Therefore, when the lower ends of the lowermost first and second lifting ribs 431a and 431b approach each other, the lifting ribs 431a and 431b may be unfolded and extended upward. When the lowermost lower ends of the lifting ribs 431a and 431b move away from each other, the lifting ribs 431a and 431b may be folded and maintain the folded state so as to be housed in the first accommodation space a1.

In the former case, the seating unit 200 may be raised vertically by the lifting ribs 431a and 431b, and in the latter case, the seating unit 200 may be lowered and seated on the upper end of the main body 110.

Further, the drive cylinder 432 according to the present invention serves to make the lower ends of the above-described lowermost first and second lifting ribs 431a and 431b move away from each other or approach each other.

The drive cylinder 432 may be installed in the above-described partition plate 140, and may include a shaft 432b connected by a hinge to the first roller ROLL 1 to be slid and a cylinder body 432a for extending and contracting the shaft 432b.

The cylinder body 432a may receive a drive signal from the controller 450 to extend and contract the shaft 432b.

The first roller ROLL 1 may be slid along the first rail R1 depending on the extending and contracting of the shaft 432b. Accordingly, the lower ends of the lowermost first and second lifting ribs 431a and 431b may move away from each other or approach each other.

Accordingly, the first and second lifting ribs 431a and 431b may be unfolded or folded to lift the seating unit 200.

The robot drive unit 440 according to the present invention may receive a driving signal from the controller and drive the first, second and third rotation motors 312a, 312b, and 312c of each auxiliary robot leg 310, so that the traveling apparatus main body unit 100 can be moved forward and backward through the joint movement of the first, second and third unit joints 311*a*, 311*b*, and 311*c*.

Meanwhile, the auxiliary robot leg unit 300 according to the present invention may be accommodated in the second accommodation space a2 formed in the traveling apparatus main body unit 100.

Figure 10:
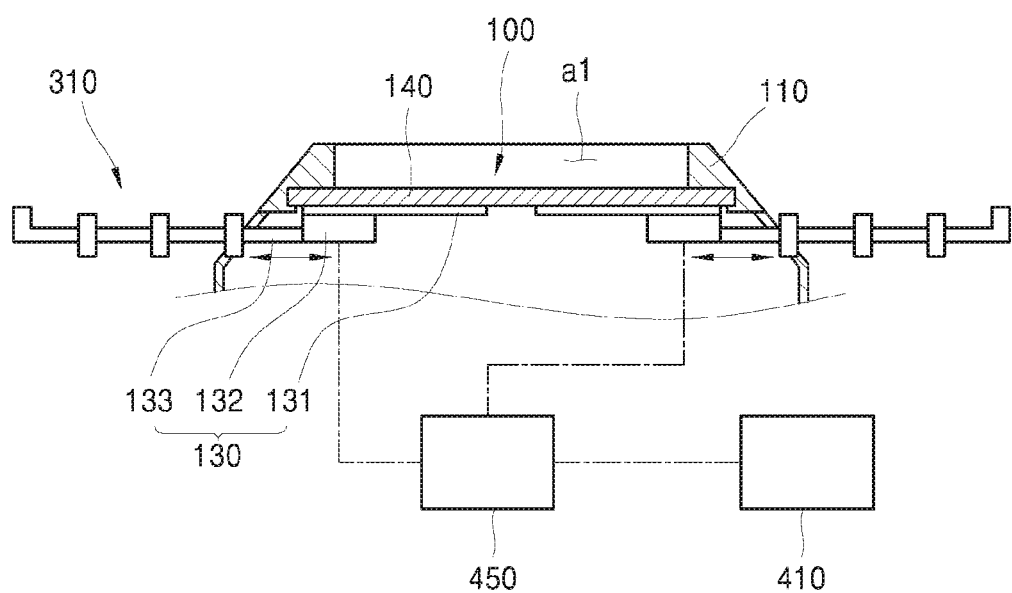
FIG. 10 is a view showing driving of a robot drive unit according to the present invention.
Figure 11:
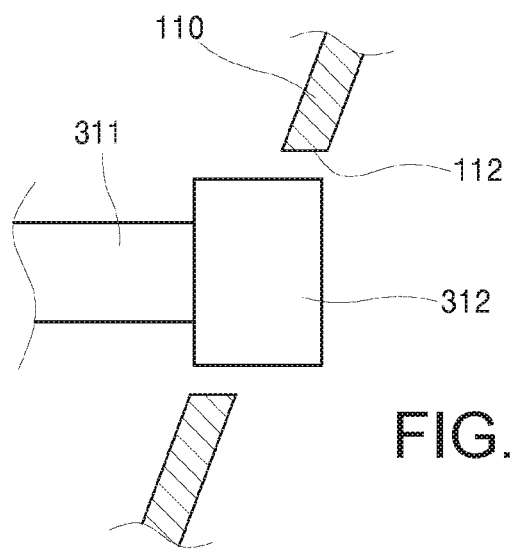
FIG. 11 is a view showing a hole formed in a main body of FIG. 10.

FIG. 10 is a view showing driving of a robot drive unit according to the present invention, and FIG. 11 is a view showing a hole formed in a main body of FIG. 10.

Referring to FIGS. 10 and 11, each auxiliary robot leg 310 may be forcibly moved by a sliding drive unit 130 installed in the interior of the traveling apparatus main body unit 100 and accommodated in the second accommodation space a2, or may protrude to both sides of the main body 110.

Holes 112 in which the first rotation motor 312*a* installed in the first unit joint 311*a* of each auxiliary robot leg 310 is positioned may be formed in both sides of the main body 110.

The auxiliary robot leg 310 may be inserted to be accommodated in the second accommodation space a2 through the hole 112, or may be withdrawn.

The sliding drive unit 130 may be installed in the lower end of the above described partition plate 140.

The sliding drive unit 130 may include a sliding rail 131 formed in the partition plate 140 and a linear motor 132 linearly moving along the sliding rail 131.

The linear motor 132 may be moved along the sliding rail 131 in response to a control signal from the controller 450.

A connection shaft 133 may be formed in the linear motor 132, and the connection shaft 133 may be connected to the first rotation motor 312*a* of each auxiliary robot leg 310.

The sliding drive unit 130 configured as described above may be installed inside the traveling apparatus main body unit 100 so as to achieve one-to-one correspondence with the number of the auxiliary robot legs 310.

The case of inserting the auxiliary robot legs 310 is described.

The controller 450 may drive the first, second and third rotation motors 312*a*, 312*b* and 312*c* of the respective auxiliary robot legs 310 to level the first, second and third unit joints 311*a*, 311*b* and 311*c*.

Then, the controller 450 may move the linear motor 132 of each sliding drive unit to the inside of the main body 110 along the sliding rail 131.

Thus, each auxiliary robot leg 310 may be inserted to the second accommodation space a2 through the hole 112 formed in the main body 110 while being connected to each connection shaft 133.

Accordingly, the auxiliary robot leg unit 300 may be accommodated in the interior of the traveling apparatus main body unit 100.

Conversely, when the auxiliary robot leg unit 300 is used, the controller 450 may reverse the inserting process to achieve the state shown in FIG. 1.

Meanwhile, referring to FIG. 6, the controller 450 according to the present invention may control driving of the travel drive unit 420, the lifting drive unit 430, the robot drive unit 440, and the sliding drive unit 130.

In addition, the controller 450 may be provided with preset commands for controlling the traveling of the plurality of wheels 190, the lifting of the seating unit 200, and the driving of the auxiliary robot leg unit 300.

The controller 450 may extract the commands from the voice input through the voice input unit 410, and control the driving of the travel drive unit 420, the lifting drive unit 430, or the robot drive unit 440 corresponding to the extracted commands.

For example, if a voice 'let's start' is input, the controller 450 may extract a preset command 'start' from the input voice, and control the driving of the travel drive unit 420 through the command, so that the traveling apparatus main body unit 100 can be moved.

Here, the command 'start' may be set with a preset traveling speed.

In this manner, the lifting position of the seating unit 200 may be adjusted by controlling the lifting drive unit 430, and the inserting, withdrawing, and driving of the auxiliary robot leg unit 300 can be used by previously setting each command.

Meanwhile, referring to FIGS. 1 to 4, and FIG. 6, a light collecting plate 240 for collecting sunlight may be installed in the rear end of the backrest portion 220 of the present invention.

In addition, the traveling apparatus main body unit 100 may be provided with a battery 120 for converting heat energy collected by the light collecting plate 240 into electrical energy for driving the voice recognition drive unit 400 and storing the electrical energy.

The battery 120 may be an energy source for practically driving the travel drive unit 420, the lifting drive unit 430, the robot drive unit 440, and the sliding drive unit 130.

Therefore, the present invention has an advantage in that the sunlight can be collected and stored at all times.

In addition, the seating unit 200 according to the present invention may be provided with a GPS module 241 for receiving position information via a satellite and transmitting the received position information to the controller.

In addition, the controller 450 may transmit the position information to a terminal, such as a portable device of another person, in a form of character information or voice information by using a wireless communication method.

Further, a weight sensor 243 for sensing the weight of a user when the user is seated and transmitting the sensed weight to the controller 450 and a temperature sensor 242 for sensing a temperature and transmitting the sensed temperature to the controller 450 may be installed in a plurality of positions of the seating unit 200.

The controller 450 may determine that the disabled person is seated in the seating unit 200 when the weight measured by the weight sensor 243 is equal to or greater than a reference weight, and drive the travel drive unit 420, the lifting drive unit 430, the robot drive unit 440, and the sliding drive unit 130.

In addition, when the temperature measured by the temperature sensor 242 reaches a reference temperature, the controller 450 may determine that the disabled person is seated in the seating unit 200, and drive the travel drive unit 420, the lifting drive unit 430, the robot drive unit 440, and the sliding drive unit 130.

Accordingly, the present invention may prevent a safety accident caused by driving of the voice recognition drive unit 400 in a state in which the disabled person is not seated in the seating unit 200.

Figure 12:
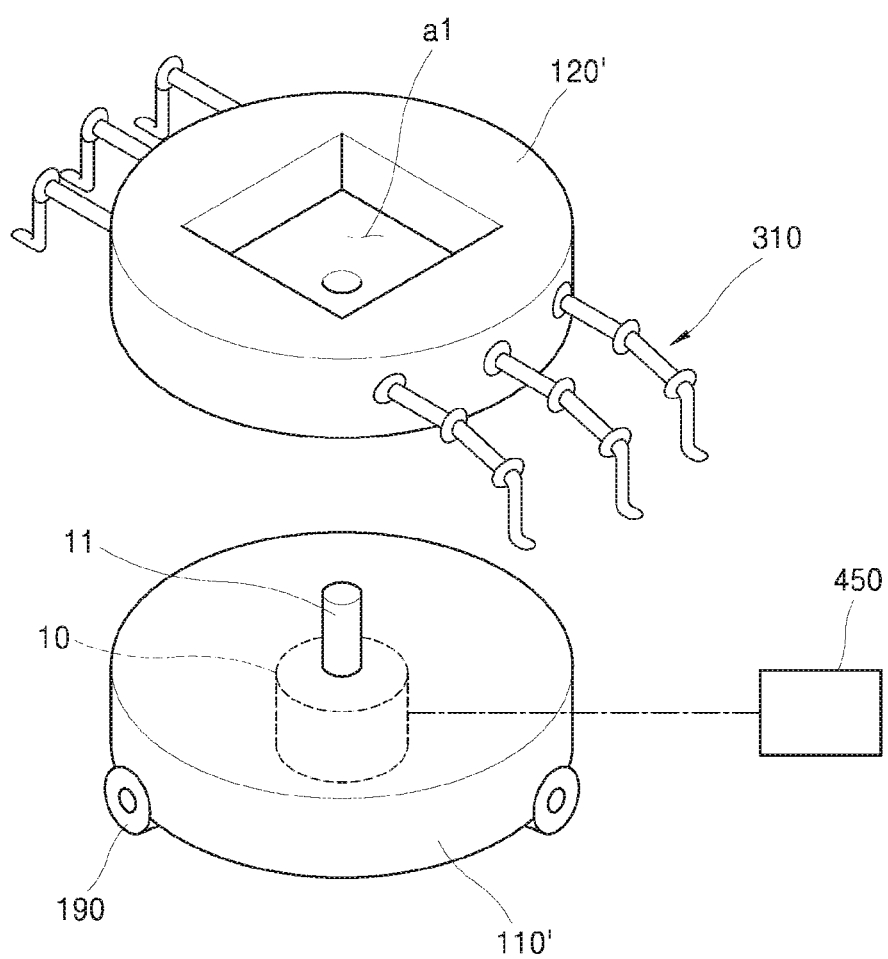
FIG. 12 is a perspective view showing another example of a traveling apparatus main body unit according to the present invention.

FIG. 12 is a perspective view showing another example of a traveling apparatus main body unit according to the present invention.

Referring to FIG. 12, the traveling apparatus main body unit 100' according to the present invention may include a lower main body portion 110' and an upper main body portion 120'.

The lower body portion 110' may be formed in a disk shape and may be provided with a rotary machine 10 having a rotary shaft 11 rotated by receiving a driving signal from the controller 450, and may be provided with the plurality of wheels 190.

The upper main body portion 120' may be formed in a disc shape, and disposed in the upper end of the lower main body portion 110'.

The upper main body portion 120' may be connected to the rotary shaft 11 and rotate, and may be provided with the auxiliary robot leg unit 300.

That is, the above-described first and second accommodation spaces a1 and a2 may be formed in the upper main body portion 120'.

According to the above-described configuration and operation, an embodiment of the present invention may include a spider leg-shaped auxiliary robot leg on a vehicle body to stably maintain the vehicle body when the vehicle runs or is stopped.

In addition, an embodiment according to the present invention may recognize the voice of the disabled person and automatically control the running condition of the vehicle body and the lifting position of a seat.

In addition, an embodiment according to the present invention may variably adjust the lifting position of the seating unit on which the disabled person is seated so that it is possible to satisfy the running condition of the disabled person when a disabled person is seated or when a vehicle body runs after the disabled person is seated.

In addition, an embodiment according to the present invention, each configuration of the seating unit may be connected by a hinge and able to be folded, so that it can be folded in a rectangular box shape to achieve easy storage in case of not running.

Further, an embodiment according to the present invention may detect that a disabled person is seated in the seating unit and control a driving related to traveling, thereby preventing a safety accident caused by the driving of the traveling apparatus before a disabled person is seated.

In addition, an embodiment according to the present invention may include a GPS module that receives position information from a satellite so that it is possible to inform a disabled person of a movement position through a voice or a display device when the disabled person moves through the traveling apparatus, and notify the guardian of the movement position of the disabled person in real time.

In addition, an embodiment according to the present invention may implement the traveling apparatus main body unit in the shape of a disk, and make the upper main body unit rotatable so that the disabled person can easily switch the direction while being seated in the seating unit.

Figure 13:
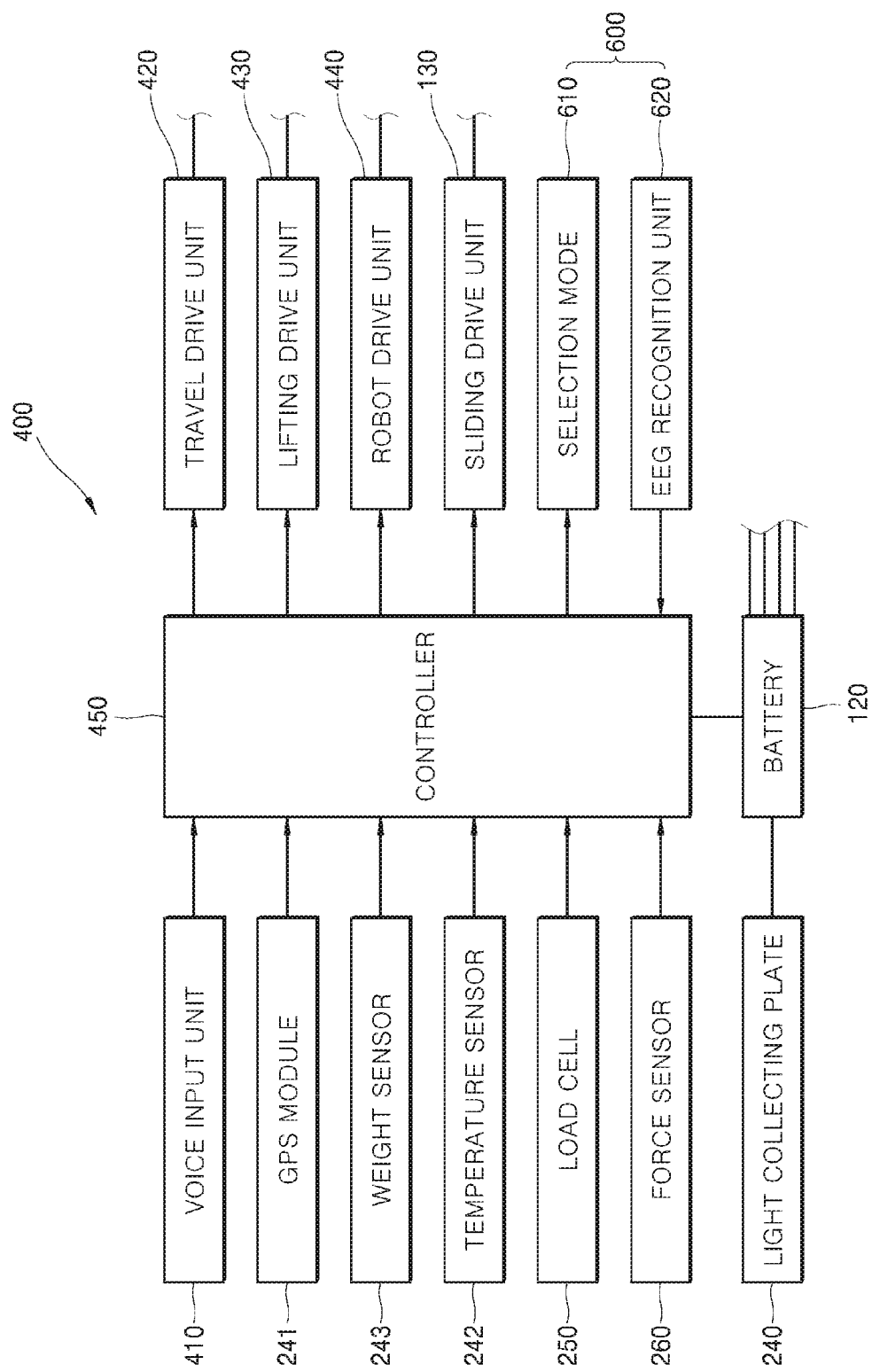
FIG. 13 is a block diagram for explaining driving of an electroencephalogram control drive unit according to the present invention.

FIG. 13 is a block diagram for explaining driving of an electroencephalogram (EEG) control drive unit according to the present invention.

Meanwhile, referring to FIG. 13, the electric wheelchair of the present invention may further include an EEG control driver.

Here, the EEG control drive unit may include a selection mode, which is connected to the controller, for selecting one of the voice recognition drive unit and the EEG control driver, and an EEG recognition unit for recognizing EEG from a head of a user and transmitting the recognized EEG to the controller.

It is preferable that information related to a gamma wave, a beta wave, an alpha wave, a theta wave, and a delta wave is previously set in the controller.

In addition, a ratio of the gamma, beta, alpha, theta, and delta waves is previously set in the controller with respect to the driving of the travel drive unit, the lifting drive unit, and the robot drive unit.

Therefore, when the use of the EEG control driver is selected from the selection mode, the controller may extract the ratio of the gamma, beta, alpha, theta, and delta waves from the recognized EEG, and control the travel drive unit, the lifting drive unit, and the robot drive unit depending on the extracted ratio.

An embodiment of the electric wheel chair with an auxiliary robot leg having a voice recognition drive system of the present invention is described above. However, it is obvious that various modifications are possible within the scope of the present invention.

Therefore, the scope of the present invention should not be limited to the embodiments described, but should be determined by equivalents to the claims, as well as the following claims.

It is to be understood that the above-described embodiments are illustrative and not restrictive in all aspects, and it is to be understood that the scope of the present invention is indicated by the appended claims rather than the foregoing description, and that all changes or modifications derived from the meaning, the range, and equivalents of the claims are to be embraced within the scope of the present invention.

The invention claimed is:

1. An electric wheelchair having a voice recognition drive system, the electric wheelchair comprising:
   a traveling apparatus main body unit which has a plurality of wheels in a lower end thereof;
   a seating unit which is installed in an upper end of the traveling apparatus main body unit so as to be able to be lifted;
   at least one auxiliary robot leg which is able to be inserted into the traveling apparatus main body unit and extended to protrude from the traveling apparatus main body unit to contact a surface upon which the wheelchair is supported when desired to provide stability to the wheelchair, and which at least one auxiliary robot leg includes multiple joint units driven by an external force; and
   a voice recognition drive unit which extracts a preset command from an externally input voice, and which drives the plurality of wheels, lifts the seating unit, and drives the at least one auxiliary robot leg.

2. The electric wheelchair of claim 1, wherein the voice recognition drive unit comprises:
   a voice input unit which is installed in the seating unit and which receives a voice from outside;
   a travel drive unit which controls traveling of the plurality of wheels;
   a lifting drive unit which controls lifting of the seating unit;
   a robot drive unit which controls driving of the at least one auxiliary robot leg; and
   a controller which is provided with preset commands for controlling the driving of the plurality of wheels, the lifting of the seating unit, and the driving of the at least one auxiliary robot leg, and which extracts the commands from a voice input through the voice input unit, and controls driving of the travel drive unit, the lifting drive unit, or the robot drive unit corresponding to the extracted command.

3. The electric wheelchair of claim 2, wherein the lifting drive unit comprises:

a lifting member which connects the traveling apparatus main body unit and a lower end of the seating unit and which has a length adjusted vertically by external power; and a drive cylinder which receives a driving signal from the controller, and controls an adjusting operation of a length of the lifting member.

4. The electric wheelchair of claim 3, wherein the lifting member comprises a plurality of lifting ribs hingedly connected to be folded so as to intersect with each other, wherein, among the plurality of lifting ribs, a first roller is provided in a lower end of a pair of lowermost lifting ribs respectively, a second roller is provided in an upper end of a pair of uppermost lifting ribs respectively, wherein a first rail on which the respective first rollers can roll is formed in the traveling apparatus main body unit, wherein a second rail on which the respective second rollers can roll is formed in a lower end of the seating unit; and wherein the drive cylinder comprises a cylinder body having a shaft which is extended and contracted in a horizontal direction in response to a drive signal from the controller, wherein the shaft is connected to a center of rotation of one of the respective first rollers and another roller is located in a fixed position on the first rail.

5. The electric wheelchair of claim 2, wherein the at least one auxiliary robot leg comprises a plurality of auxiliary robot legs arranged in a plurality of positions on both sides of the traveling apparatus main body unit, wherein each of the plurality of auxiliary robot legs comprises:
a plurality of unit joints; and
a plurality of rotation motors which connect the plurality of unit joints to be rotated, and which are driven in response to a driving signal from the robot drive unit.

6. The electric wheelchair of claim 5, wherein holes for allowing the plurality of auxiliary robot legs to be inserted and withdrawn are formed in a plurality of positions on both sides of the traveling apparatus main body unit, and wherein an accommodation space for receiving the plurality of auxiliary robot legs inserted through the holes is formed in an interior of the traveling apparatus main body unit, and wherein, in the accommodation space, a sliding drive unit which slides the plurality of auxiliary robot legs so that the plurality of auxiliary robot legs can be inserted into the accommodation space or extended from the accommodation space in response to a control signal from the controller is installed.

7. The electric wheelchair of claim 2, wherein the seating unit is connected to the lifting drive unit, and comprises:
a seat portion;
a backrest portion which is hingedly connected to an end of the seat portion so as to be foldable;
a handgrip portion which is hingedly connected to both sides of the seat portion so as to be foldable; and
a leg rest portion which is hingedly connected to a front end of the seat portion so as to be foldable,
wherein the seating unit is formed in a rectangular box shape when the backrest portion and the leg rest portion are folded.

8. The electric wheelchair of claim 2, wherein the seating unit is provided with a light collecting plate for collecting sunlight, and
wherein a battery for converting heat energy collected by the light collecting plate into electric energy for driving the voice recognition drive unit and storing the electrical energy is installed in the traveling apparatus main body unit.

9. The electric wheelchair of claim 2, wherein the seating unit is provided with a GPS module for receiving position information via a satellite and transmitting the received position information to the controller, and
a weight sensor for sensing a weight of a user when the user is seated and transmitting the sensed weight to the controller and a temperature sensor for sensing a temperature and transmitting the sensed temperature to the controller are installed in a plurality of positions of the seating unit.

10. The electric wheelchair of claim 2, wherein the traveling apparatus main body unit comprises:
a lower main body portion having a disc shape which is provided with a rotator having a rotation shaft rotated in response to a drive signal from the controller, and which is provided with a plurality of wheels; and
an upper main body portion having a disc shape which is disposed in an upper end of the lower main body portion, and connected to the rotation shaft and rotates, and which is provided with the at least one auxiliary robot leg.

11. The electric wheelchair of claim 2, further comprising an electroencephalogram (EEG) control driver,
wherein the EEG control drive unit comprises:
a selection mode which is connected to the controller, and which selects to use one of the voice recognition drive unit and the EEG control driver; and
an EEG recognition unit which recognizes EEG from a head of a user and transmits the recognized EEG to the controller,
wherein information related to a gamma wave, a beta wave, an alpha wave, a theta wave, and a delta wave is previously set in the controller, and the controller extracts a ratio of the gamma, beta, alpha, theta, and delta waves from the recognized EEG, and controls the travel drive unit, the lifting drive unit, and the robot drive unit depending on the extracted ratio, and
wherein the ratio of the gamma, beta, alpha, theta, and delta waves is previously set in the controller with respect to driving of the travel drive unit, the lifting drive unit, and the robot drive unit.

\* \* \* \* \*